United States Patent Office 3,560,595
Patented Feb. 2, 1971

3,560,595
FLUOROELASTOMER SEALANTS
Leslie Nathan Phillips, Farnborough, and David Kenneth Thomas and George Wood, Farnham, Surrey, England, assignors to Minister of Aviation in Her Britannic Majesty's Government of the United Kingdom of Great Britain and Northern Ireland, London, England
No Drawing. Filed Aug. 1, 1966, Ser. No. 569,063
Claims priority, application Great Britain, Aug. 3, 1965, 33,119/65; Nov. 30, 1965, 50,766/65
Int. Cl. C08f 29/22
U.S. Cl. 260—900                                8 Claims

ABSTRACT OF THE DISCLOSURE

A curable sealant composition is provided comprising a fluorohydrocarbon elastomer having an average molecular weight less than about 20,000 and containing a sufficient amount of unsaturated carbon-carbon linkages to cure the sealant composition, a fluorohydrocarbon elastomer having an average molecular weight greater than about 40,000, and a suitable curing agent. Such sealant compositions have the advantage that they are readily extrudble, can be applied without solvent, or with the application of relatively little solvent and also may be cured in situ by heating at moderate temperatures for reasonable periods of time, say at less than 200° C. for less than 24 hours.

---

This invention relates to sealants and is particularly concerned with sealants for use in rendering tanks, containers and the like and joints therein fluid tight.

Certain difficulties are associated with the use of sealants. Where it is necessary to use a solvent for dissolving a solid sealant material, or to reduce the viscosity of a viscous liquid sealant before it can be applied, the solvent will in due course be removed by diffusion through and evaporation from the sealant layer. This removal may lead to dimensional changes such as shrinkage or warping of the sealant layer or to internal voids.

These difficulties are increased if it is necessary to heat the sealant layer to relatively high temperatures to bring about vulcanisation thereof; and further aggravated if the sealant is required to be effective at elevated temperatures, a particular example being the case of fuel tanks for aircraft required to operate at speeds at which, as a result of kinetic heating, the fuel tanks may have to withstand sustained periods at temperatures in excess of 120° C.

Solventless liquid polysulphide elastomer sealants are known but these have poor thermal stability and very limited life above 120° C.

Also, present sealants based on fluorohydrocarbon elastomers whilst having good thermal stability require about 30 parts of solvent per hundred of sealant and suffer particularly from the difficulties mentioned above, normally requiring relatively high temperatures, i.e. over 200° C. for several days to effect cure. The curing of such a sealant in situ would thus be hardly practicable.

The present invention is concerned with the provision of and processes for manufacturing an improved sealant based on fluorohydrocarbon elastomers which involves chemical modification of the essential saturated commercial fluorohydrocarbon elastomers in order to increase their general chemical reactivity so that they can be more readily manipulated and vulcanised. The invention aims at providing fluorohydrocarbon sealants which can be extruded and placed in a desired sealing position without the addition of a solvent, or exceptionally with the addition of very moderate amounts of a solvent, and which can then be cured in situ at moderate temperatures for reasonable periods.

According to the present invention, a sealant which can be manipulated and cured in situ is produced by blending high and low molecular weight fluorohydrocarbon elastomers of which the low molecular weight elastomer or possibly both elastomers have been chemically modified so as to introduce unsaturated carbon-carbon links into the molecules by, for example, a process of dehydrofluorination or a process of allylation or of dehydrofluorination followed by allylation.

Furthermore the blend may advantageously include other liquid non-fluorine-containing polymeric substances chosen for their ability to form homogeneous mixes with a fluorohydrocarbon elastomer, to lower the viscosity thereof to render it more extrudable, to increase the tack, and after vulcanisation to resist extraction by fuels and solvents.

Although the high molecular weight fluorohydrocarbon elastomer for the sealant composition may optionally have been subjected to a process which introduces unsaturated linkages as aforesaid, it is generally not worthwhile in practice doing so, especially when it is a minor portion of the composition.

Typically the fluorohydrocarbon elastomers are those based on hexafluoropropylene and vinylidene fluoride such as the various Viton elastomers (where Viton is a trademark of Du Pont de Nemours) which are copolymers or terpolymers of hexafluoropropylene and vinylidene fluoride with or without further constituents such as tetrafluoroethylene. Particular Viton elastomers which may be used are known as Viton A, the copolymer of vinylidene fluoride and hexafluoropropylene, generally in a ratio of about 60 to 40 by weight, and Viton B.

It is essential for the low molecular weight fluorohydrocarbon elastomer to have an average molecular weight normally less than 20,000. The high molecular weight fluorohydrocarbon elastomer should then be a solid having an average molecular weight normally greater than 40,000. Thus, for example, the low molecular weight fluorohydrocarbon elastomer may be the low molecular weight form of the Viton A elastomer which is known as Viton LM and has an average molecular weight of around 4,000–5,000, while the high molecular weight fluoroelastomer may be Viton A which has an average molecular weight of about 80,000.

Chemical modification of the fluorohydrocarbon elastomer by allylation may be carried out by the action of diallylamine hydrochloride under pressure at an elevated temperature.

In accordance with a feature of the invention, a low molecular weight or a high molecular weight fluorohydrocarbon elastomer is chemically modified as aforesaid in order to introduce unsaturated carbon-carbon links into the molecules by a process of dehydrofluorination wherein the fluorohydrocarbon elastomer is dissolved at a normal or a moderately elevated temperature in a substituted amide solvent, for example, dimethylformamide or dimethylacetamide.

The substituted amide acts as both solvent and reagent and the process takes place more readily and can even be effected at ambient temperatures, if a salt is present which is soluble in the substituted amide solvent. Salts which may be used include alkali (which includes ammonium) cyanides and thiocyanates and alkaline earth metal nitrates. Specific examples are sodium, potassium and ammonium cynide, sodium, potassium and ammonium thiocyanate, and calcium nitrate.

The low molecular weight form of Viton A known as Viton LM can be dehydrofluorinated in accordance with the above process by refluxing a 20 percent solution of the Viton elastomer in dimethylformamide for 15 minutes and precipitating the gum for example, by pouring into water. The gum is then dissolved in acetone, reprecipitated and finally dried in an oven at 60° C. for one week. The resulting dehydrofluorinated product will be hereinafter referred to as Viton DHFLM.

The blended sealant composition may advantageously be rendered more extrudable by the inclusion of a high molecular weight resin based on diphenyl oxide and dimethyl ether of p-xylylene glycol and made in accordance with a Friedel-Crafts type reaction which will be referred to hereinafter as the Friedel-Crafts resin. This resin is disclosed in co-pending U.S. patent application No. 427,455 filed Jan. 22, 1965, now abandoned, refiled as Ser. No. 669,698 on Sept. 11, 1967 now U.S. Patent 3,518,228 and can be prepared as follows.

A mixture of 166 gms. of diphenyl oxide and 160 gms. of p-di(methoxy)xylylene are mixed with 2 ml. of a 10 percent solution of stannic chloride in o-dichlorobenzene. This mixture is heated to 200° C. when methyl alcohol begins to distill off. After 55 ml. of methyl alcohol have been collected the reaction mixture is cooled to stop the reaction and a thin, low viscosity resin is obtained .

The sealants produced according to the invention are particularly suitable for use in aircraft fuel tanks which as a result of kinetic heating have to sustain temperatures exceeding 120° C. for prolonged periods. In accordance with the feature of the invention the sealants are placed in a desired sealing position and are cured at a temperature of less than 200° C. for not more than 24 hours.

Whilst in general it will be advantageous to use the sealant compounds produced without a solvent, in particular circumstances a solvent such as methyl ethyl ketone may be used for ease of application.

Examples will now be given of the manufacture of extrudable solventless sealing compositions using Viton A, allylated Viton A, and Viton LM which has been dehydrofluorinated to Viton DHFLM as hereinbefore described. Various compositions also use the Friedel-Crafts resin as above described, Diak 3 (trademark) which is dicinnamylidene-1,6-hexanediamine, and a linear polyamide resin known as Versamid 140 (trademark).

EXAMPLE 1

A sealant composition was produced by blending the following substances in parts by weight as follows:

Viton A ------------------------------------------- 60
Viton DHFLM --------------------------------------- 40
Friedel-Crafts resin ------------------------------ 20
Medium thermal black ------------------------------ 20
Magnesium oxide ----------------------------------- 15
Diak 3 -------------------------------------------- 2

The sealant composition was extrudable at 60° C.

A cure of one day at 130° C. followed by 7 days at room temperature gave a rubbery material whose acetone soluble fraction was less than 1.5%.

At equilibrium with acetone the volume fraction of rubber in the swollen phase ($V_r$ value) was 0.30.

EXAMPLE 2

A sealant composition was produced by blending the following substances in part by weight as follows:

Viton A ------------------------------------------- 60
Viton DHFLM --------------------------------------- 40
Friedel-Crafts resin------------------------------- 10
Styrene monomer ----------------------------------- 10
Medium thermal black ------------------------------ 20
Magnesium oxide ----------------------------------- 15
Diak 3 -------------------------------------------- 2

The sealant composition was extrudable at 60° C.

A cure of 1 day at 130° C. followed by 7 days at room temperature gave a rubbery material whose acetone soluble fraction was less than 2% and $V_r$ value 0.32.

EXAMPLE 3

A sealant composition was produced by blending the following substances in parts by weight as follows:

Viton A ------------------------------------------- 60
Viton DHFLM --------------------------------------- 40
Friedel-Crafts resin ------------------------------ 15
Diallyl phthalate --------------------------------- 5
Medium thermal black ------------------------------ 20
Magnesium oxide ----------------------------------- 15
Diak 3 -------------------------------------------- 2

The sealant composition was extrudable at 60° C.

A cure of 1 day at 130° C. followed by 7 days at room temperature gave a rubbery material whose acetone soluble fraction was 2.5% and $V_r$ value 0.30.

EXAMPLE 4

A sealant composition was produced by blending the following substance in parts by weight as follows:

Viton A ------------------------------------------- 60
Viton DHFLM --------------------------------------- 40
Friedel-Crafts resin ------------------------------ 15
Versamid 140 -------------------------------------- 3
Medium thermal black ------------------------------ 20
Magnesium oxide ----------------------------------- 15

The sealant composition was extrudable at 60° C.

After 1 week at room temperature the rubbery material had an acetone soluble fraction of less than 2% and a $V_r$ of 0.35.

EXAMPLE 5

15 gms. of Viton A containing 2 percent of allyl groups were blended with 85 gms. of Viton LM containing 4 percent of allyl groups to give a composition which could be extruded through a gun at room temperature.

10 gms. of triethylene tetramine were mixed with 100 gms. of the blend. After 18 hours at room temperature and 1 hour at 65° C. the vulcanisate had a swelling ratio in acetone of 1.9; this swelling ratio was unchanged by heating for another hour at 65° C.

EXAMPLE 6

10 gms. of Viton A containing 2 percent of allyl groups were blended with 90 gms. of Viton LM containing 4 percent of allyl groups to give a composition which could be extruded through a gun at room temperature.

14 gms. of hexamethylene diamine were mixed with the blend. After 12 hours at room temperature and 5 hours at 65° C. the vulcanisate had a swelling ratio in acetone of 1.5

We claim:

1. A process for producing a sealant which comprises chemically modifying a low molecular weight fluorohydrocarbon elastomer having a molecular weight less than about 20,000 by a process of dehydrofluorination or allylation so as to introduce sufficient unsaturated carbon-carbon links therein to effect the cure of said sealant, blending a minor proportion of the resulting modified fluorohydrocarbon elastomer with a major proportion of a high molecular weight fluorohydrocarbon elastomer having an average molecular weight greater than about 40,000 and a curing agent for said low molecular weight fluorohydrocarbon elastomer in such amounts as to effect the cure thereof.

2. A process according to claim 1 in which each of said fluorohydrocarbon elastomers comprises a copolymer of hexafluoropropylene and vinylidene fluoride.

3. A process according to claim 1 in which the chemical modification of said low molecular weight fluorohydrocarbon elastomer is by a process of dehydrofluorination which comprises dissolving the elastomer in a substituted amide solvent.

4. A process according to claim 3 in which said substituted amide solvent is dimethylformamide or dimethylacetamide.

5. A process according to claim 3 in which a salt selected from the group consisting of alkali cyanides, alkali thiocyanates and alkaline earth nitrates is also dissolved in said solvent.

6. A process according to claim 1 in which said curing agent is selected from the group consisting of dicinnamylidene-1, triethylene tetramine and hexamethylene diamine.

7. A process according to claim 2 in which each of said fluorohydrocarbon elastomers comprises a copolymer of hexafluoropropylene and vinylidene fluoride in the weight ratio of about 40:60.

8. A process acording to claim 1 in which each of said fluorohydrocarbon elastomers comprises a terpolymer of hexafluoropropylene, vinylidene fluoride, and tetrafluoroethylene.

References Cited
UNITED STATES PATENTS

| | | | |
|---|---|---|---|
| 3,069,401 | 12/1962 | Gallagher | 260—87.7 |
| 3,147,314 | 9/1964 | Cluff | 260—837 |
| 3,291,864 | 12/1966 | Eldridge et al. | 260—900 |
| 3,340,222 | 9/1967 | Fang | 260—900 |

MURRAY TILLMAN, Primary Examiner

C. J. SECCURO, Assistant Examiner

U.S. Cl. X.R.

200—86.7